United States Patent [19]
Gold et al.

[11] Patent Number: 5,808,921
[45] Date of Patent: Sep. 15, 1998

[54] INTERFACE EMULATION SYSTEM AND METHOD FOR APPLICATIONS UTILIZING EMBEDDED PROCESSORS

[75] Inventors: Jeffrey J. Gold, Los Angeles; David L. Koza, Lakewood; Mike W. Tolmasoff, Whittier; Steven R. Zammit, Redondo Beach, all of Calif.

[73] Assignee: Hughes Aircraft Company, Los Angeles, Calif.

[21] Appl. No.: 586,328

[22] Filed: Jan. 12, 1996

[51] Int. Cl.⁶ ........................................ G06F 9/455
[52] U.S. Cl. .................... 364/580; 364/578; 395/500; 395/183.04
[58] Field of Search .................... 364/580, 578; 395/500, 183.04

[56] References Cited

U.S. PATENT DOCUMENTS

| | | | |
|---|---|---|---|
| 4,920,481 | 4/1990 | Binkley et al. | 364/200 |
| 5,088,033 | 2/1992 | Binkley et al. | 395/500 |
| 5,202,976 | 4/1993 | Hansen et al. | 395/500 |
| 5,452,239 | 9/1995 | Dai et al. | 364/578 |
| 5,475,624 | 12/1995 | West | 364/578 |

*Primary Examiner*—James P. Trammell
*Assistant Examiner*—Hien Vo
*Attorney, Agent, or Firm*—Elizabeth E. Leitereg; Terje Gudmestad; Wanda K. Denson-Low

[57] ABSTRACT

A system for testing an embedded control processor for a spacecraft comprises an Emulated Spacecraft Control Processor (24) which contains the embedded processor (26), a simulation engine (12), and a host computer (14). The Emulated Spacecraft Control Processor (24), executing embedded application software, provides an emulated input/output interface for the embedded processor (26) to communicate simulated sensor data, command data, actuator command data, and telemetry data to the simulation engine (12) and the host computer (14). The Emulated Spacecraft Control Processor (24) processes the simulated sensor data and the command data to form the actuator command data and the telemetry data. The simulation engine (12) processes the actuator command data from the Emulated Spacecraft Control Processor (24) to simulate the system dynamics of the spacecraft in real-time, and to thereby produce the simulated sensor data. The host computer (14) provides the command data and receives the telemetry data from the Emulated Spacecraft Control Processor (24).

21 Claims, 2 Drawing Sheets

INTERFACE EMULATION SYSTEM AND METHOD FOR APPLICATIONS UTILIZING EMBEDDED PROCESSORS

This invention was made with Government support under contract No. F04701-92-C-0049 awarded by the United States Air Force. The Government has certain rights in this invention.

TECHNICAL FIELD

This invention relates to systems for validating and verifying embedded processor-based systems.

BACKGROUND ART

The increasing size and complexity of various spacecraft and control subsystems therefor have created a need for detailed validation and verification before deployment. Examples of spacecraft subsystems requiring validation and verification include: (i) multiprocessor-based systems which can have complex software architectures; (ii) fault detection and response systems providing extended autonomous operations; (iii) multiple-articulated payloads and multibody control; (iv) precision payload pointing systems with multiple interacting elements; and (v) sophisticated ground software for automated spacecraft operations.

However, system-level ground testing to verify full system performance of a spacecraft can be costly and/or inadequate. Present implementations of hardware-in-the-loop systems to provide ground testing require racks of special purpose interface hardware and harnessing to integrate an embedded computer with a high-fidelity, non-linear, real-time simulation.

SUMMARY OF THE INVENTION

It is an object of the present invention to provide a low-cost system for verifying an embedded processor-based system which requires less facility resources (e.g. test equipment and floor space) in comparison to previously-implemented hardware-in-the-loop systems.

A further object of the present invention is to provide a system for testing an embedded processor-based system which does not require racks of special purpose interface hardware and harnessing to integrate the embedded processor-based system with a high-fidelity, non-linear, real-time dynamic simulation.

In carrying out the above objects, the present invention provides a system for testing an embedded processor, such as an embedded processor for a spacecraft. The system comprises an Emulated Spacecraft Control Processor (ESCP) which contains the embedded processor, a simulation engine, and a host computer. The Emulated Spacecraft Control Processor, executing embedded application software, provides an emulated input/output interface for the embedded processor to communicate simulated sensor data, command data, actuator command data, and telemetry data, with the simulation engine and the host computer.

The Emulated Spacecraft Control Processor processes the simulated sensor data and the command data to form the actuator command data and the telemetry data. The simulation engine processes the actuator command data from the Emulated Spacecraft Control Processor to simulate the system dynamics of the spacecraft in real-time, and thereby produce the simulated sensor data for input to the Emulated Spacecraft Control Processor. The host computer provides the command data to the Emulated Spacecraft Control Processor, and receives the telemetry data from the Emulated Spacecraft Control Processor.

In a preferred embodiment, the simulation engine executes program steps asynchronously with respect to the embedded processor. Here, the Emulated Spacecraft Control Processor includes a dual-port memory for emulating the input/output interface for the embedded processor and data transfer logic which monitors cycles of the embedded processor to arbitrate access to the dual-port memory. The data transfer logic is operative to allow simulation engine access to the dual-port memory when the embedded processor performs a memory cycle, wherein the access is performed before a subsequent machine cycle of the embedded processor. The data transfer logic is operative to inhibit access by the simulation engine to the dual-port memory when an input/output cycle is performed by the embedded processor.

Also in a preferred embodiment, the simulated sensor data, the command data, the actuator command data, and the telemetry data are communicated via an industry standard bus. Here, the system further comprises an interactive bus manager which communicates the command data and the telemetry data between the bus and the host computer. Additionally, the simulated sensor data and actuator command data are communicated between the simulation engine and the Emulated Spacecraft Control Processor using the industry standard bus.

Further in carrying out the above objects, the present invention provides a method of testing an embedded processor based upon the above-described steps.

Embodiments of the present invention are advantageous in that the simulation engine and the Emulated Spacecraft Control Processor communicate across a high speed digital bus.

These and other features, aspects, and embodiments of the present invention will become better understood with regard to the following description, appended claims, and accompanying drawings.

BEST MODE FOR CARRYING OUT THE INVENTION

Figure 1:
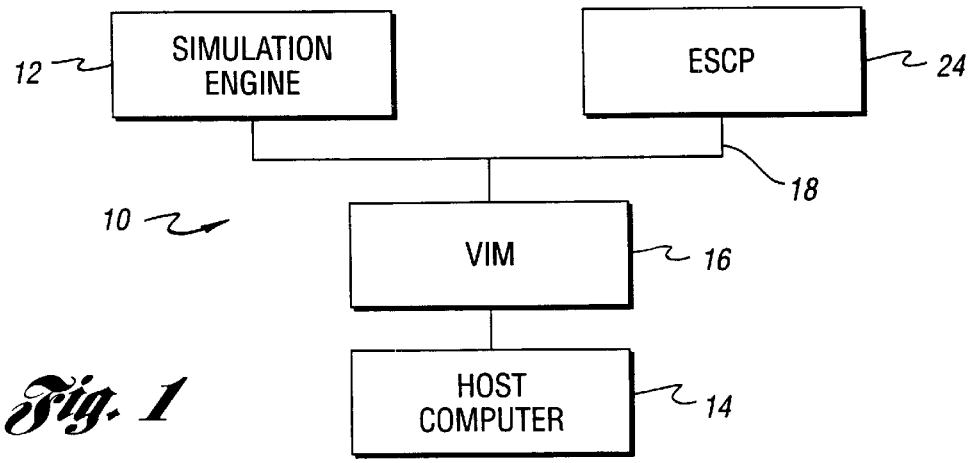
FIG. 1 is a block diagram of an embodiment of a real-time spacecraft simulation system in accordance with the present invention.

FIG. 1 is a block diagram of a real-time spacecraft simulation system 10 in accordance with the present invention. The real-time spacecraft simulation system 10 can be embodied by an Applied Dynamics Real Time Station (AD RTS) manufactured by Applied Dynamics. The AD RTS system is a stand-alone VMEbus-based real-time simulation and analysis system which uses a mixture of 9U×400 mm ADI processor and input/output cards. Physically, the AD RTS system can be contained in a mini-tower housing.

The real-time spacecraft simulation system 10 includes one or more simulation engines (SE) 12 which are used to simulate system dynamics in real time. For an AD RTS system, the simulation engines 12 are in the form of processor cards installed therein.

Each simulation engine 12 is a processor that solves the dynamic model equations of motion in real-time. One or more simulation engines can be installed in the real-time spacecraft simulation system as problem size and complexity increase throughput requirements.

A host computer 14 is utilized for simulation development, cross-compiling, interfacing to a user, and displaying output information. The host computer 14 can be embodied by a computer workstation such as ones available from Sun, Hewlett-Packard, or Vax, for example. The host computer 14 runs simulation system software having interactive commands which provide simulation control. The simulation system software can be embodied by ADI Simsystem software. The host computer 14 also utilizes a real-time plotting software package to provide strip chart and x-y plot capabilities. Such a real-time plotting package can be embodied by the Simplot software package.

The host computer 14 interfaces with a VMEbus interactive manager (VIM) 16. The VIM 16 is operative to initialize the real-time spacecraft simulation system 10, download application software to the embedded processors in the real-time spacecraft simulation system 10, and monitor VMEbus traffic in real time. An additional feature of the VIM 16 is to provide bi-directional data transfer between the processors in the real-time spacecraft simulation system 10 and the host computer 14 via a VMEbus 18.

An Emulated Spacecraft Control Processor (ESCP) 24 is a VMEbus-compatible card which emulates a Spacecraft Control Processor (SCP). The ESCP 24 includes a microprocessor along with supporting circuitry to execute flight software. The ESCP 24 and the SE 12 are accessed to perform data transfers, and to provide/receive data to/from the VIM 14 for real-time data logging and user control. A plurality of ESCPs can be included to reflect the redundancy of operational systems.

The VMEbus 18 is utilized for all command, telemetry, sensor, and actuator interfacing. Actuator data is communicated from the ESCP 24 to the SE 12 via the VMEbus 18. Sensor data is communicated from the SE 12 to the ESCP 24 via the VMEbus 18. Telemetry data is communicated from the ESCP 24 to the host computer 14 via the VIM 16 and the VMEbus 18. Command data is communicated from the host computer 14 to the ESCP 24 via the VMEbus 18 and the VIM 16.

Alternative embodiments of the ESCP 24 include circuitry to support interfaces that cannot be implemented with the VMEbus 18, such as a very fast interface or an analog interface.

Figure 2:
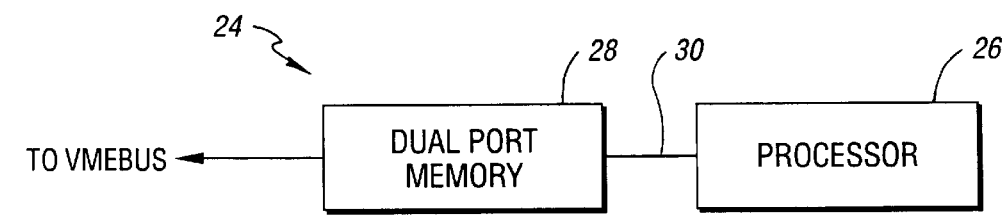
FIG. 2 is a block diagram of an embodiment of an Emulated Spacecraft Control Processor in accordance with the present invention.

FIG. 2 is a block diagram of an embodiment of the ESCP 24 in accordance with the present invention. The ESCP 24 includes a processor 26 such as a GP31750 microprocessor unit. The processor 26 communicates with the right-hand side (RHS) of a dual-port memory 28 via a bus 30. The VMEbus communicates with the left-hand side (LHS) of the dual-port memory 28 via a separate bus. The dual-port memory 28 emulates the I/O space of the processor 26. A majority of the I/O data in the ESCP 24 resides in the dual-port memory 28. There is arbitration logic when loading and reading from the dual-port memory 28 to prevent contentions in the event that the same location is being accessed from both sides simultaneously.

The use of a busy signal, which is provided to a losing side of an arbitration, is avoided in the dual-port memory 28 so that the flight software can execute in real-time on the ESCP 24. To avoid this possibility, a FIFO and data transfer logic with arbitration are utilized. The data transfer logic monitors the cycles of the processor 26. If a memory cycle is performed, the logic allows one access to the dual-port memory 28 from the LHS, then waits for the next cycle. The dual-port memory access is completed before the next machine cycle. If an input/output cycle is performed, the logic waits for an indication of the next machine cycle.

For a write operation to the LHS of the dual-port memory 28, the dual-port memory address and data are loaded into the FIFO. The transfer logic monitors an FIFO empty flag to determine the existence of data to transfer. When there is no data to transfer, the logic then waits for the next machine cycle.

For a read operation to the LHS of the dual-port memory 28, the simulation reads FIFO status bits to insure that there is no data in the FIFO which is waiting to be loaded into the dual-port memory 28. A read is initiated upon the FIFO empty flag indicating an empty transfer FIFO. Once a read is initiated, the read arbitration logic determines the next machine cycle. The read arbitration holds the VMEbus data transfer acknowledge until the dual-port memory 28 can be safely read.

Figure 3:
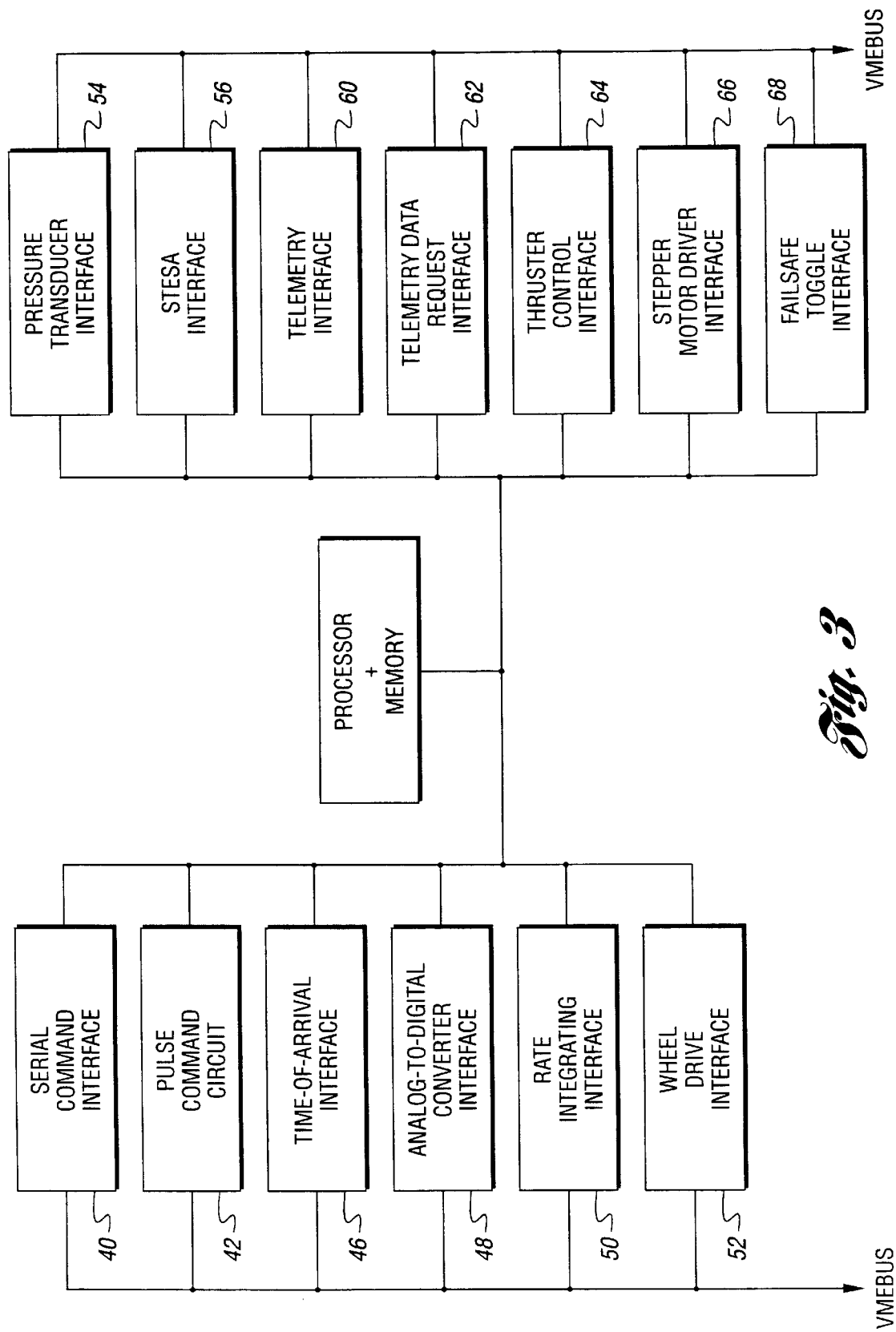
FIG. 3 is a functional block diagram of an embodiment of the Emulated Spacecraft Control Processor.

FIG. 3 is a functional block diagram of the ESCP 24. Functionally, the ESCP 24 provides a serial command interface 40, a pulse command circuit 42, a time-of-arrival interface 46, an analog-to-digital converter interface 48, a rate integrating interface 50, a wheel drive interface 52, a pressure transducer interface 54, a STESA interface 56, a telemetry interface 60, a telemetry data request interface 62, a thruster control interface 64, a stepper motor driver interface 66, and a failsafe toggle interface 68. The above-described interfaces interface the processor 26 to the VMEbus.

The serial command interface 40 communicates serial commands containing data and address information from the VMEbus to the processor 26. In a preferred embodiment, the serial commands are 24-bits in length: 16 bits for data and 8 bits for address information. The serial commands are generated in the host computer 14 and passed through a simulation via the SE 12 to serial command holding registers. An interrupt is generated to cause the flight software to read the serial command information.

The simulation provides a predetermined delay between serial commands to replicate system response. The predetermined delay can be 210 msec, for example. The simulation also sequences between ground station commands and command requests from the ESCP 24.

The pulse command circuit 42 communicates pulse commands from the VMEbus to the processor 26. Much of the pulse command logic is implemented with the COSIM portion of the simulation, with the ESCP 24 providing additional support. The ESCP 24 is physically powered on at all times, but emulates an OFF mode by holding the processor reset signal low. This keeps the processor in a reset condition until the reset is released. The ESCP 24 is initialized in the OFF mode, and turned on by receiving an ON pulse command.

The time-of-arrival interface 46 provides time event information to the processor 26. Typically, this information is provided for sensors (e.g. sun and earth sensors) that produce pulse-type outputs requiring high resolution (e.g. 1 microsecond) event time tagging. The time-of-arrival interface 46 accepts data representing the time of arrival, relative to a synchronous ESCP event, for various sensor inputs. A master clock is incremented at predetermined intervals, for example, every microsecond. The simulation reads the value of the master clock over the VMEbus to calculate the time-of-arrival (TOA) data that is to be loaded into dual-port memory 28.

If the simulation determines that a sensor pulse (or any other TOA signal) is going to occur during the next simulation frame, the value is calculated and loaded into the dual-port memory 28. A write to a TOA dual-port memory location is detected and a corresponding TOA event bit is set. The TOA event bit is then latched into a holding register and is read (and cleared) by the flight software.

The time-of-arrival logic allows the ESCP 24 to determine with 1 microsecond of resolution when a particular event has occurred within any particular RTCI. In general, the ESCP 24 checks a status register at the beginning of each synchronous event to determine if a TOA event has occurred. If a TOA event has occurred, the ESCP 24 reads a second register containing a 16-bit data word that holds the time that the event occurred relative to the last synchronous event.

Therefore, if the simulation knows that a TOA event is about to occur and knows the time since the last synchronous event, the simulation can load the TOA register prior to the next synchronous event if the TOA event occurs before the next synchronous event, or after the next synchronous event should the event occur after the next synchronous event. This forms the basis for the simulation TOA algorithm.

In a preferred embodiment for implementing the TOA algorithm, the ESCP 24 provides a master clock that has a 1 microsecond resolution and a maximum time of one hour. The clock is accessible to the simulation engine 12 across the VMEbus. The ESCP 24 also provides a register that latches the value of the clock every synchronous event. The simulation determines the time since the last synchronous event by differencing the master clock and the master-clock-latched value of the last synchronous event. The ESCP clock and latched clock are read at the beginning of every simulation frame regardless of whether or not a TOA event is about to occur.

The simulation knows when the TOA event will occur before it occurs in real-time by using knowledge of the position at frame n+1 with respect to frame n, and extrapolating the position out to frame n+2, also with respect to frame n. The first integration is implemented using Adams-Bashforth second order integration:

$$x(n+1)=x(n)+0.5*dt*(3.0*f(n)-f(n-1))$$

where f(n)=dx(n)/dt and dt is the simulation numerical integration step size. Note that the term x(n+1) represents the next frame's position, but in frame n.

The extrapolation is performed using a second order predictor that passes a parabola through the data point x(n) and matches the slopes at f(n) and f(n-1) This predictor is given by the following equation:

$$x(n+2)=x(n)+dt*f(n)+((f(n)-f(n-1))/2*dt))*(dt\hat{}2)$$

Figure 4A:
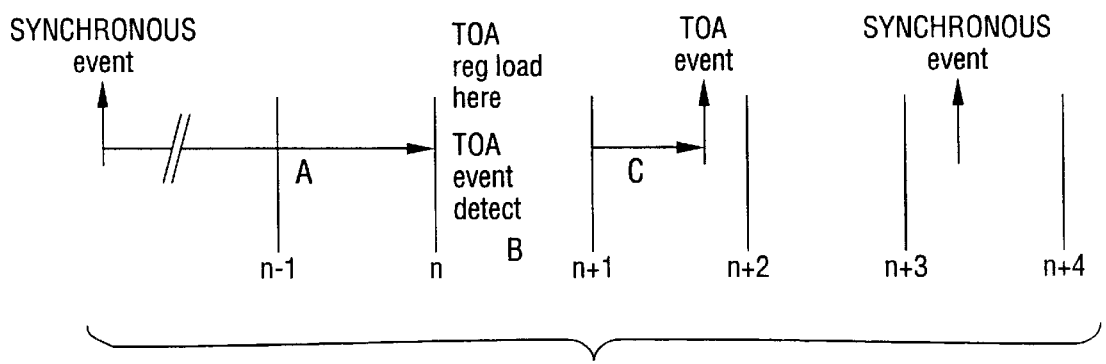
FIGS. 4A and 4B are an illustration depicting a time-of-arrival method for use in embodiments of the present invention.

The TOA algorithm is illustrated in FIG. 4(A–B). When the simulation determines that a TOA event is about to occur between frame n+1 and n+2, the SE 12 takes the time since the last synchronous event (time A), as read at the beginning of frame n, and adds in the simulation frame time (time B) and the delta of the TOA event within the next simulation frame (time C, between frame n+1 and n+2), and writes this value to the TOA data register. This write sets the appropriate bit in the TOA status register to inform the ESCP 24 that a TOA event has occurred since the last synchronous event. There is a time tag register and status bit for each of the eight TOA registers. The time C can be determined by interpolating the event between frames n+1 and n+2.

Figure 4B:
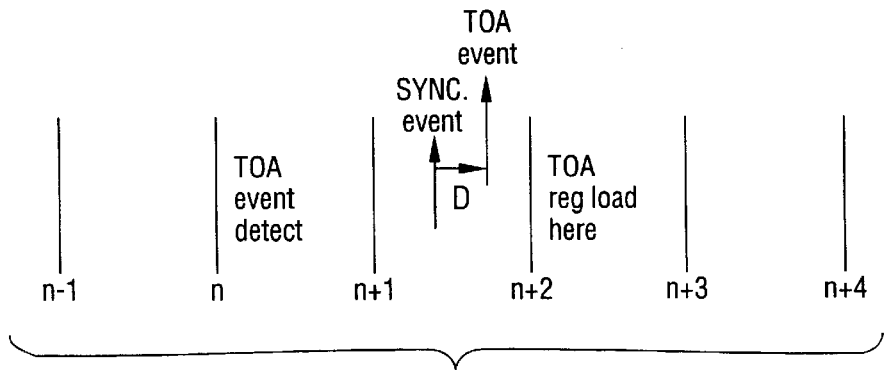

If the synchronous event occurs before the TOA event as depicted in FIG. 4B, the TOA data register is not loaded in this or the next simulation frame, but rather between frames n+2 and n+3. The data loaded is the difference between the TOA event and the time until the next synchronous event.

The wheel drive interface 52 utilizes rate divider words to modify tachometer signals from the simulated wheels. A first counter is a pulses-per-revolution counter (programmed by the flight software) to count the number of tachometer pulses per wheel revolution. If it is set to nine, it will overflow once every wheel revolution (since there are nine teeth on the wheel). A second counter (also programmed by the flight software) is incremented by the output of the pulses-per-revolution counter. This counter is a speed modifier counter and will overflow once per loaded number of revolutions. The output of this second counter is what provides a basis for the TOA information. The simulation reads the rate divider words every frame to determine the TOA value that is to be calculated and loaded into the TOA interface.

The analog-to-digital converter (ADC) interface 48 provides simulated, digitized analog information to the processor 26. Typically, this information is provided by sensors (e.g. sun, earth, and gyro) that produce an analog output.

The simulation provides all of the ADC values every simulation frame regardless of those signals that actually selected and used by the flight software. There can be an additional 32 ADC channels added as spares from the original 32 channels already defined.

The flight software continues the data transfer when it loads an ADC data request, at which time the analog-to-digital interface 48 latches the request identifier and triggers an end-of-conversion timer that simulates the time it takes to perform a normal ADC function. For example, this time can be set to approximately 10 microseconds. When the timer times out, an end-of-conversion interrupt is generated to the processor indicating data is ready. The flight software then resets the end of conversion interrupt and reads the ADC data. The latched request identifier is used by the address translation HDL to redirect the ADC data request to the appropriate dual-port memory location that holds the ADC data for that request. It is noted that the simulation loads the end-of-conversion timer and reference voltage locations at initialization.

The rate integrating interface 50 provides count-based event information to the processor 26. Typically, this information originates within inertial reference units (IRU) which produce signal outputs which are functions of the acceleration rate along the sensed axis. As with the analog-to-digital interface 48, the rate integrating interface 50 is multiplexed and the implementations are therefore similar. The simulation provides all of the rate information every simulation frame regardless of those signals that are usually selected and used by the flight software. The simulation converts the simulated rate into frequency, and multiplies the frequency by the simulation integration step size to produce counts to keep a running count of the IRU output for each channel.

The pressure transducer interface (PTI) 54 is another rate integrating interface providing count-based information to determine spacecraft tank pressure and propellant level. Data for the pressure transducer interface comes from a tank pressure model executing on the simulation engine. There are two resolution modes for each pressure transducer (a high resolution and low resolution mode) as well as two sampling modes (dwell vs. normal).

The simulation determines the following information from the ESCP 24 with regard to what the PTI 54 is to provide, if anything: (i) a number of edges to count, (ii) a resolution mode requested, (iii) whether the ESCP 24 is to sequence through all pressure transducers or dwell on a single pressure transducer, and/or (iv) a channel for the ESCP 24 to convert/read. All of the above can be read at the simulation integration frame rate.

The STESA interface 56 communicates serial digital data to the ESCP 24. In the real system, when an active sensor has data to transfer, it sends a data ready signal to the SCP. The SCP detects the leading edge and generates 64 clock pulses, which clock 64 data bits into the SCP. The first clock pulse clears the data ready back at the sensor, the last clock generates an interrupt (if enabled) to tell the processor that data is present.

The ESCP 24 uses the transfer FIFO and address decode to generate an interrupt when the simulation sends sensor data. The simulation reads transfer enable and code status bits every frame to determine which sensor is enabled and in what mode. Four 16-bit data words are transferred to separate dual port memory locations corresponding to the individual sensor. The STESA HDL decode detects the write strobe to the fourth location and sets the STESA select latch, the data ready interrupt, and disables the corresponding transfer status. The simulation only transfers STESA data when the transfer enable status bit is set for the given STESA. The STESA select latch points the address translation HDL the DPM locations corresponding to the current sensor. A clear to the interrupt register re-enables the STESA transfer status bits. The simulation also delays sending STESA data by 16 to 48 msec when the mode status bit is set to delay (usually only in the dual string configuration using 2 ESCP's).

The telemetry interface 60 communicates telemetered (status) information from the processor 26 to the simulation via the VMEbus. Information transfer is synchronized on word as well as telemetry frame boundaries. The telemetry interface 60 comprises a dual FIFO configuration with one FIFO serving as an output path for normal telemetry data with a second FIFO serving as an output path for dwell telemetry data. The output port of both FIFOs are interfaced to the VMEbus.

Four timers/counters allow the simulation to specify the time between normal and dwell telemetry request interrupts, the number of words that form a telemetry minor frame, and the number of minor frames that form a major frame. Representative data rates for the telemetry request interrupts are 1, 2, 4 and 4.8 Kbit/second, while a representative number of words per minor and major frames are 256 and 32, respectively.

The simulation loads the word timer, the minor frame time and the major frame timer with format information at initialization. At initialization, the simulation also resets the FIFOs. The simulation is also capable of resetting the bits of the frame status.

The word timer generates normal and dwell telemetry requests (interrupts) at a continuous rate. Major and minor frame status is sent to the frame status register and also loaded into the FIFO to allow for frame formatting information later. The frame status is read by the simulation to determine if there is a minor frames' worth of data available. If so, then the contents of the FIFO are dumped to the host computer 14 for formatting and display.

The telemetry data request interface 62 communicates telemetered spacecraft information from the simulation to the processor 26 as a result of a flight software request. The telemetry data request interface 62 includes a TEU request register within which the ESCP 24 loads 16-bits of TEU request data. The simulation reads this register every simulation frame to determine the existence of a request. When data is valid, the simulation reads the data, clears the register, and sends back telemetry data approximately 1.667 seconds later. When the TEU data is sent back, it is loaded into dual port memory and decoded to generate a TEU data ready interrupt.

The simulation reads the TEU data request register at the simulation frame rate. If the data is non-zero, this indicates a TEU request. The simulation reads and clears the register, interprets the data to determine the TEU request channel and provides the 8-bit data (integer 0–255) back to the SCP (given a time-invariant, user selectable delay of approximately 1.667 seconds that is quantized by the simulation integration frame rate). The data typically consists of sampled analog, bi-level, and conditioned analog data from other spacecraft subsystems.

The thruster control interface 64 communicates high resolution (typically 1 msec) thruster on-line information to the simulation. The thruster control interface 64 is time critical as the simulation integration step is too coarse to accurately integrate thruster-generated forces and torques.

To provide the required accuracy, a set of 16 counters are created in the ESCP 24 hardware that can be polled/read by the simulation at the integration frame rate. The 4-bit unsigned counters provide thruster-on times down to 1 millisecond of resolution.

When a thruster is firing, a 1 msec counter is enabled to track how long the thruster has been on. The simulation reads all thruster-on-time registers at the beginning of each simulation frame to determine if there is a change (or a "delta") from the last time the register was read.

The ESCP thruster counters only advance when the thruster is firing. The thruster dynamics model determines if the time-on is physically realizable. By reading the counters over two consecutive simulation frames, the change in count provides the amount of time that the thrusters have fired over the past simulation frame. The amplitude of the force/torque generated by the thrusters are modulated to provide an equivalent thruster-generated force/torque when integrated over the simulation frame.

The stepper motor driver interface 66 makes available to the simulation four-bit logicals representing the state of motor winding drivers at the simulation integration frame rate (approximately 5 msec).

The failsafe toggle interface 68 performs a failsafe toggle function with a combination of simulation and circuitry. The simulation will initiate a toggle event as part of a scenario by turning off the ESCP 24. The failsafe toggle interface then configures any hardened latches (if necessary) for the redundant unit. A TOGGLE ON pulse command is issued to the same ESCP 24, or to a redundant ESCP when configured as a dual string. The TOGGLE ON signal is routed to the appropriate latches and the ESCP 24 thinks it was toggled on and will initialize as such.

The above-described architectures are utilized for emulating actual input/output interfaces of an embedded processor system to achieve a low-cost, high-fidelity hardware-in-the-loop simulator required for system developers. This approach provides the capability to execute the embedded software within the application environment while substantially reducing the complexity of high-fidelity hardware-in-the-loop simulations.

As described, the emulated input/output interfaces are capable of converting a variety of data formats relative to several time references to a digital format tied to either the real-time simulation or the embedded processor time line. Data transfers to the embedded processor in the ESCP 24 can be either: (i) caused by an event on the embedded processor; (ii) caused as a result of a simulation event or an embedded processor event; or (iii) generated periodically. Data transfers from the embedded processor can represent either: (i) an elapsed time; (ii) a status transfer; (iii) digital data value representing an analog voltage; (iv) data with a synchronization signal; or (v) command data.

The real-time simulation executing on an independent processor, and the embedded processor are asynchronous engines which communicate via non-intrusive and contention-free data transfers. Data transfers to and from the embedded processor use an arbitration scheme which exploits the bus architecture of the embedded processor.

Digitized clock information originating from the embedded processor allows the real-time simulation to coordinate with the timeline of the embedded processor. Critical simulation-generated timing information is created using real-time extrapolation techniques with knowledge of the embedded processor timeline. Elapsed time events which occur in the embedded processor relative to the real-time simulation timeline are captured in the emulated input/output interface and are made available to the real-time simulation.

The above-described embodiments of the present invention have many advantages. By emulating actual input/output interfaces of an embedded control processor system, a significant reduction in cost and facility space is required in comparison to previously-implemented hardware-in-the-loop systems. Further, integration and qualification testing of embedded software is supported by a single platform rather than a number of separate test platforms. As a result of this integration, testing can be performed more efficiently. The single common platform can share a set of common databases for multi-disciplinary uses, such as flight software integration and test, attitude control system analysis and validation, mission/on-station procedure validation, and mission/on-station procedure personnel training.

While the best mode for carrying out the invention has been described in detail, those familiar with the art to which this invention relates will recognize various alternative designs and embodiments for practicing the invention as defined by the following claims.

What is claimed is:

1. A system for testing an embedded processor, the system comprising:

an emulated spacecraft control processor which contains the embedded processor, the emulated spacecraft control processor providing an emulated input/output interface for the embedded processor to communicate simulated sensor data, command data, actuator command data, and telemetry data, wherein the emulated spacecraft control processor processes the simulated sensor data and the command data to form the actuator command data and the telemetry data;

a simulation engine which processes the actuator command data from the emulated spacecraft control processor to simulate system dynamics of the spacecraft in real-time, the simulation engine operative to produce the simulated sensor data for input to the emulated spacecraft control processor based on the simulated system dynamics; and a host computer which provides the command data and receives the telemetry data from the emulated spacecraft control processor.

2. The system of claim 1 wherein the simulated sensor data, the command data, the actuator command data, and the telemetry data are communicated via a VMEbus.

3. The system of claim 2 further comprising a VMEbus interact manager which communicates the command data and the telemetry data between the VMEbus and the host computer.

4. The system of claim 1 wherein the simulation engine and the emulated spacecraft control processor are housed in a single housing.

5. The system of claim 1 wherein the emulated spacecraft control processor includes a dual-port memory for emulating the input/output interface for the embedded processor and data transfer logic which monitors cycles of the embedded processor to arbitrate access to the dual-port memory.

6. The system of claim 5 wherein the data transfer logic is operative to allow an access to the dual-port memory when the embedded processor performs a memory cycle, wherein the access is performed before a subsequent machine cycle of the embedded processor.

7. The system of claim 6 wherein the data transfer logic is operative to inhibit access to the dual-port memory when an input/output cycle is performed by the embedded processor.

8. The system of claim 1 wherein the simulation engine executes program steps a synchronously with respect to the embedded processor.

9. The system of claim 8 wherein the emulated spacecraft control processor provides a master clock accessible to the simulation engine to provide a timeline for the embedded processor, and wherein the simulation engine utilizes the master clock to anticipate a time-of-arrival event for the simulated sensor data before the time-of-arrival event occurs in real-time.

10. The system of claim 9 wherein the simulation engine anticipates the time-of-arrival event at a current frame by extrapolating time-of-arrival data to at least one subsequent frame.

11. The system of claim 10 wherein the simulation engine interpolates time-of-arrival data for two subsequent frames to anticipate the time-of-arrival event.

12. A method of testing an embedded processor, the method comprising the steps of:

providing an emulated spacecraft control processor which emulates an input/output interface for the embedded processor;

receiving simulated sensor data and command data for the embedded processor using the emulated spacecraft control processor;

processing the simulated sensor data and the command data using the embedded processor to form actuator command data and telemetry data;

communicating the telemetry data to a host computer;

communicating the actuator command data to a simulation engine; and processing the actuator command data, using the simulation engine, to simulate system dynamics of the spacecraft in real-time and thereby produce subsequent simulated sensor data for input to the emulated spacecraft control processor.

13. The method of claim 12 wherein the simulated sensor data, the command data, the actuator command data, and the telemetry data are communicated via a VMEbus.

14. The method of claim 12 wherein the simulation engine and the emulated spacecraft control processor are housed in a single housing.

15. The method of claim 12 wherein the emulated spacecraft control processor includes a dual-port memory for emulating the input/output interface for the embedded processor, the method further comprising the step of monitoring cycles of the embedded processor to arbitrate access to the dual-port memory.

16. The method of claim 15 further comprising the step of allowing an access to the dual-port memory when the embedded processor performs a memory cycle, wherein the access is performed before a subsequent machine cycle of the embedded processor.

17. The method of claim 16 further comprising the step of inhibiting access to the dual-port memory when an input/output cycle is performed by the embedded processor.

18. The method of claim 12 wherein program steps performed in the step of processing by the simulation engine is performed a synchronously with respect to program steps performed in the step of processing by the embedded processor.

19. The method of claim 18 further comprising the steps of:

providing a master clock accessible to the simulation engine to provide a timeline for the embedded processor; and anticipating a time-of-arrival event for the simulated sensor data before the time-of-arrival event occurs in real-time, the time-of-arrival event anticipated by the simulation engine using the master clock.

20. The method of claim 19 wherein the simulation engine anticipates the time-of-arrival event at a current frame by extrapolating time-of-arrival data to at least one subsequent frame.

21. The method of claim 20 wherein the simulation engine interpolates time-of-arrival data for two subsequent frames to anticipate the time-of-arrival event.

* * * * *